(12) United States Patent
Hofer et al.

(10) Patent No.: US 10,569,961 B2
(45) Date of Patent: Feb. 25, 2020

(54) SAFE CONVEYOR SYSTEM

(71) Applicant: Carl Zeiss Vision International GmbH, Aalen (DE)

(72) Inventors: Thomas Hofer, Rosenberg (DE); Ralf Meschenmoser, Essingen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/444,373

(22) Filed: Jun. 18, 2019

(65) Prior Publication Data
US 2019/0300290 A1    Oct. 3, 2019

Related U.S. Application Data

(63) Continuation of application No. PCT/EP2017/078871, filed on Nov. 10, 2017.

(30) Foreign Application Priority Data

Dec. 19, 2016 (DE) .................. 10 2016 225 485

(51) Int. Cl.
*B65G 37/00* (2006.01)
*B65G 15/22* (2006.01)
(Continued)

(52) U.S. Cl.
CPC .............. *B65G 37/00* (2013.01); *B65G 15/22* (2013.01); *B65G 21/10* (2013.01); *B65G 35/06* (2013.01); *B65G 47/64* (2013.01); *B65G 47/648* (2013.01)

(58) Field of Classification Search
CPC ........ B65G 47/64; B65G 47/53; B65G 35/06; B65G 37/02; B65G 37/00; B65G 21/10;
(Continued)

(56) References Cited

U.S. PATENT DOCUMENTS 5,062,174 A    11/1991   DaSalvo
5,078,257 A *  1/1992   Carter, Jr. ............. B23P 21/004
                                              198/346.2
(Continued)

FOREIGN PATENT DOCUMENTS

DE    7219720 U     11/1972
DE    2754387 A1    7/1978
(Continued)

OTHER PUBLICATIONS

Internet information about rotary tables available from the Alztec company (German and English version), retrieved from the Internet <URL: http://www.alztec.com/drehtische.php>, last accessed Jun. 17, 2019.
(Continued)

*Primary Examiner* — James R Bidwell
(74) *Attorney, Agent, or Firm* — Thrive IP®; Georg Hasselmann

(57) ABSTRACT

A conveyor device for a transport container for spectacle lenses includes a linear conveyor unit for conveying the transport container in a rectilinear direction, a rotary unit for rotating the linear conveyor unit, and a first housing element for the rotary unit. The first housing element includes a plate and rotates conjointly with the linear conveyor unit in the direction of rotation. The first housing element that conjointly rotates in the rotation of the linear conveyor unit has a first opening through which the linear conveyor unit penetrates the plate and wherein the linear conveyor unit is spaced apart from the plane by an assigned gap dimension, which is smaller than or equal to 5 mm.

20 Claims, 9 Drawing Sheets

(51) Int. Cl.
*B65G 21/10* (2006.01)
*B65G 47/64* (2006.01)
*B65G 35/06* (2006.01)

(58) Field of Classification Search
CPC ............ B65G 15/22; B65G 2201/0235; B65G 2207/14; B65G 2207/18; B65G 2203/04
USPC .................................. 198/400, 370.06, 580
See application file for complete search history.

(56) References Cited

U.S. PATENT DOCUMENTS

| | | | | |
|---|---|---|---|---|
| 6,308,818 | B1* | 10/2001 | Bonora | B65G 19/02 198/414 |
| 8,061,500 | B2* | 11/2011 | Baccini | H01L 21/681 198/345.1 |
| 2004/0134755 | A1* | 7/2004 | Sticht | B65G 35/06 198/465.2 |
| 2007/0137981 | A1* | 6/2007 | Kettelson | B65G 17/002 198/411 |
| 2013/0166062 | A1 | 6/2013 | Casey et al. | |

FOREIGN PATENT DOCUMENTS

| | | |
|---|---|---|
| DE | 4335195 A1 | 4/1995 |
| DE | 29506230 U1 | 8/1995 |
| DE | 4119790 C2 | 8/1996 |
| EP | 1947035 A1 | 7/2008 |
| EP | 3064455 A1 | 9/2016 |
| GB | 1389820 A | 4/1975 |
| GB | 1596015 A | 8/1981 |
| JP | 63037023 A | 2/1988 |
| JP | 01156225 A | 6/1989 |

OTHER PUBLICATIONS

Internet information about rotary tables for pallets available from the kardexmlog company (German and English version), retrieved from the Internet <URL: http://www.kardex-mlog.de/de/products-mlog/foerdertechnik/umsetzer.html>, last accessed Jun. 17, 2019.
Industry norm "Sicherheit von Maschinen [Safety of machinery]", DIN EN 349, Sep. 2008, relevance is found in paragraph [0009] of the instant specification.
Industry norm "Sicherheit von Maschinen—Sicherheitsabstände gegen das Erreichen von Gefährdungsbereichen mit den oberen und unteren Gliedmaßen [Safety of machinery—Safety distances to prevent hazard zones being reached by upper and lower limbs]", DIN EN ISO 13857, Jun. 2008, relevance is found in paragraph [0009] of the instant specification.
International Search Report issued in international application PCT/EP2017/078871, to which this application claims priority, dated Feb. 7, 2018, and English-language translation thereof.
A. Neudoerfer, "Konstruieren sicherheitsgerechter Produkte [Construction of safe products]." Berlin, Springer Vieweg, ISBN 978-3-642-33889-2, pp. 246 and 439, and English-language translation thereof, 2013.
Office action by the German Patent and Trademark Office issued in German patent application DE102016225485.5, to which this application claims priority, and English-language translation thereof, dated Jul. 10, 2017.
Office action by the German Patent and Trademark Office issued in German patent application DE102016225485.5, to which this application claims priority, and English-language translation thereof, dated Jun. 18, 2019.

* cited by examiner

SAFE CONVEYOR SYSTEM

CROSS REFERENCE TO RELATED APPLICATIONS

This application is a continuation application of international application PCT/EP2017/078871, filed Nov. 10, 2017, which claims priority to German patent application DE 10 2016 225 485.5, filed on Dec. 19, 2016, both of which are hereby incorporated by reference in their entireties.

TECHNICAL FIELD

The disclosure relates to a conveyor device for transport containers for spectacle lenses, having a transport table which has a round transport surface and a transport drive for conveying the transport containers in a horizontal transporting direction along the transport surface, and having a rotary drive for rotating the transport table about a vertical axis (A).

BACKGROUND

A corresponding conveyor device which is configured as a rotary table is available from the Alztec company (available at the url www.alztec.com/drehtische.php). This rotary table is walk-on-able and is conceived for the conveying of pallets and therefore has relatively large dimensions. The rotary table is used in a combination with roller conveyors and in the peripheral region, thus in the region of the connection to the roller conveyors and in the region of the conveyor rollers has potential hazard spots where there is a potential risk of injury by bruising or shearing off a hand or a finger.

Rotary tables for pallets are also available from the kardexmlog company (available at the url www.kardex-mlog.de/de/products-mlog/foerdertechnik/umsetzer.html). These rotary tables serve for transferring pallets at corners.

EP 1 947 035 A1 shows a sorting device for roller conveyor devices, having a sorting table which has a square sorting face. The sorting face is composed of a multiplicity of small rotary tables which can be rotated in order for the conveying direction to be changed.

Generic conveyor devices, or conveyor devices that are generically similar, are also known from documents EP 3 064 455 A1, JP S63 37023A, DE 295 06 230 U1, DE 43 35 195 A1, DE 72 19 720 U, DE 41 19 790 C2, GB 1 389 820 A, and DE 27 54 387 A1. A stacking device can be derived from US 2013/0166062 A1.

JP H01 156225 A also describes a conveyor device of the generic type.

All of the known solutions have large gaps or a plurality of exposed parts which move relative to one another or relative to stationary parts. During the operation there is an increased risk of injury when the parts are touched, for example by an operator's hand. The operator can come into contact with the driven moving parts in the case of any inattentive operation and suffer injuries, for example bruises or shear cuts. Moreover, the known systems are provided for transporting large piece goods and typically have relatively large dimensions so that a corresponding conveyor system overall needs a large installation area.

DIN EN 349:1993+A1:2008 establishes minimum spacings in order for the bruising of body parts to be prevented. DIN EN ISO 13857:2008 determines safety spacings for preventing hazardous regions being reached by the upper and lower limbs.

SUMMARY

It is an object of the present disclosure to provide a device for conveying transport containers for spectacle lenses which is capable of being used in a flexible manner and herein meets high safety requirements. The installation space required, or the installation area required, respectively, herein is typically to be as small as possible. Moreover, use under clean room or gray room conditions is to be optionally possible.

This object is achieved according to the disclosure by a conveyor device having a linear conveyor unit as well as by an N×M matrix of conveyor devices having linear conveyor units, or by the use of one of the conveyor devices in a matrix of this type, having a linear conveyor unit.

Exemplary embodiments and developments of the disclosure are disclosed below.

The conveyor device according to the disclosure for a transport container for spectacle lenses comprises a linear conveyor unit for conveying the transport container in a rectilinear direction and a rotary unit for rotating the linear conveyor unit. Rotating the linear conveyor unit in the context of the present description is understood to be the re-alignment of the linear conveyor unit for conveying the transport container in another rectilinear direction that deviates from the original rectilinear direction.

The rotary unit is disposed in a housing in order for the rotary unit to be protected against being touched. The housing comprises a first housing element having a plane and conjointly rotating in the rotation of the linear conveyor unit. The first housing element that conjointly rotates in the rotation of the linear conveyor unit has one or a plurality of first openings by way of which the linear conveyor unit penetrates the plane.

The linear conveyor unit is spaced apart from the plane by way of one or a plurality of gaps having assigned gap dimensions.

It is provided according to the disclosure that the gap dimensions of all of the gaps are smaller than or equal to 5 mm. It is furthermore provided according to the disclosure that the first housing element has a plurality of second openings which penetrate the plane and have assigned opening widths, all of the latter being smaller than or equal to 5 mm.

A quasi-continuously covered plane which represents an active touch safeguard is achieved for a user. It is reliably prevented that a user inadvertently reaches into a gap or into an opening and on account thereof potentially suffers bruises or shear cuts.

The suitability of the conveyor device for transport containers for spectacle lenses means that relatively small transport containers having a width of less than 40 cm and a length of less than 50 cm can be transported reliably.

In this context, the term gap dimension means a spacing between mutually contiguous and mutually neighboring components. Such components can be a component part of the linear conveyor unit or be component parts of the housing. This can also refer to the spacing between the plane and contiguous components such as, a stationary housing wall of the conveyor installation.

In this context, openings are, for example, round or angular recesses or clearances which are disposed in the plane, for example, and can serve for reducing the weight of the mass to be moved.

A plane is presently understood to be a planar face along which the transport containers are transported. The plane can in particular be configured so as to be a component part of a plate from a metal or plastics material, or of a perforated sheet-metal plate, that serves as a housing element. The housing element is typically mounted on a transport table, for example mounted so as to be removable. The plane can be configured as a surface of the transport table and serve for supporting from below the transport containers to be transported, or for preventing any tilting of the transport containers. The housing element mounted by the transport table is likewise moved in the rotation of the transport table.

In an exemplary embodiment of the disclosure, a stationary circular-cylindrical second housing element which encloses the rotary unit and which does not conjointly rotate in the rotation of the linear conveyor unit is present, wherein the plane of the first housing element that conjointly rotates in the rotation of the linear conveyor unit is situated within the stationary second housing element and in terms of shape is configured so as to be complementary to the stationary second housing element.

In the case of this exemplary embodiment of a conveyor device, the plane of the first housing element that conjointly rotates in the rotation of the linear conveyor unit is typically spaced apart from the stationary second housing element by way of a gap having a gap dimension which is smaller than or equal to 5 mm. A touch safeguard is guaranteed on account thereof.

In the case of this exemplary embodiment, the plane is disposed in or directly on a stationary, in particular vertically running, cylinder. The stationary cylinder forms a housing external side or housing external wall of the conveyor device. On account of the stationary cylinder, the conveyor installation on the housing external wall thereof does not have any movable parts such that there is no risk of bruising or shearing to operators at this location.

The gap dimension between the plane that forms a transport surface and the cylinder is smaller than or equal to 5 mm, so as to form a protection against reaching-in by an operator. The cylinder thus has a diameter which corresponds substantially to the diameter of the transport surface. The cylinder, together with the transport surface, configures a touch safeguard and prevents any unintentional touching of the drive components and avoids dangerous bruising or shearing locations in order for operators to be protected. The cylinder, together with the plane that forms the transport surface, thus configures a housing.

On account of the openings having a diameter or an available width of smaller than or equal to 5 mm, the plane representing the transport surface forms a protective guard for operators and closes off the upper side of the cylinder. On account thereof, potentially hazardous components such as rotating rollers or revolving drive belts are secured against any inadvertent contact by the operator. The external dimensions of the cylinder configure the maximum interference contour of the conveyor installation. That is to say, a potential danger zone of the conveyor device is limited to the dimensions of the cylinder.

It can moreover be provided that the components comprised by the rotary unit and the linear conveyor unit are disposed within the housing, or protrude beyond the housing by less than 5 mm. The driven components of the conveyor device can thus be received within the housing formed by the cylinder and the transport surface, or project beyond the housing by 5 mm or less, respectively. On account thereof, the required installation space is reduced, on the one hand, and the risk of bruising or shearing points is reduced, on the other hand.

In order for interference-free transportation to be guaranteed, it is provided in the case that the transport surface is disposed in the cylinder that the upper end of the cylinder wall is flush with the transport surface.

The conveyor device is in particular conceived for transporting comparatively small transport containers, the dimensions of the latter typically not exceeding 50 cm in length and 40 cm in width. Optical components, for example lenses for spectacles, spectacle frames, or other small parts, can be transported in the transport containers. It can be provided that the diameter of the cylinder, or the diameter of the transport surface, respectively, is less than 60 cm, typically is 50 cm, or 40 cm, or else 30 cm or less, in order for transport containers having small dimensions to also be transported efficiently, that is to say on a small installation area. The linear conveyor unit serves in particular for the automatically driven transport of a transport container along a predefined conveying stream. A conveying stream is composed of a plurality of transport containers spaced apart successively.

The transporting direction in a typically horizontal plane is changed by way of the rotary unit in that the rotary unit rotates the transport table, or the transport surface, respectively, about an axis, in particular in the case of a horizontal disposal of the plane about a vertical axis. The rotary unit herein can rotate the linear conveyor unit by angles that are selectable in an arbitrary manner. For example, the rotary unit has a servo motor or a stepper motor which is actuated by a control device in order for a desired angle to be set. It is thus possible for individual transport containers to be diverted from a continuous conveying stream or to be directed into a second conveying stream. Since arbitrary angles can be set by way of the rotary unit, not only is diverting transversely to the conveying stream herein possible, but different directions can be chosen. Branching of the conveying stream so as to form a plurality of part-streams is therefore also possible.

The cylinder forms a circular cylinder. The transport surface forms the upper side of the cylinder and is configured so as to be circular. The round transport surface closes off the stationary cylinder toward the top such that the cylinder, together with the transport surface, configures a housing that is at least closed off toward the top. The longitudinal axis of the cylinder typically runs in the vertical direction. The cylinder is configured so as to be hollow inside, and therefore in the interior of the cylinder configures an installation space for receiving components of the conveyor device. The cylinder can have a base on the lower side, the base supporting the cylinder per se, or the individual components of the conveyor installation, respectively. A frame having height-adjustable feet can be provided for setting up the conveyor device, the frame serving as a mechanically stable and height-adjustable mounting for supporting the conveyor device or the base, respectively. The conveyor device can thus be disposed so as to be directly contiguous to an end or to a start of a conveyor belt.

In one exemplary embodiment, it can be provided that the rotary unit is disposed within the closed-off housing, typically disposed completely within the closed-off housing. Driven or moving parts, respectively, in the case of which there is a risk of bruising, are thus disposed completely within the cylinder or the closed-off housing, respectively, and are thus outside the hazardous zone for operators.

In order for the safety of the conveyor device to be further improved, it can be provided that the external edge of the plane forming the transport surface has a closed, circular profile, and a central region of the transport surface is configured as a mesh surface having round or angular openings, in particular recesses. The dimensions of the openings, in particular of the recesses, in terms of the diameter thereof or in terms of the available width thereof, are typically smaller than or equal to 5 mm, typically smaller than or equal to 4 mm.

In an exemplary embodiment it is provided that the conveyor device is used in a clean room or a gray room. A clean room is a room in which disturbing particles present in the air are kept as far as possible to a minimum by way of special purification measures. Moreover, parameters such as, for example, temperature and/or air humidity, can be monitored and kept consistent. Clean rooms are used in the case of production methods that are susceptible to contamination, for example in the manufacturing of optical apparatuses or optical components, or in the production of sterile foodstuffs. A gray room differs from a clean room in terms of the reduced requirements set for the purity of air.

For such an application it is advantageous for the conveyor device to be able to be purged with purified air. In order for an ideally laminar air stream to be achieved as possible herein it is advantageous for the openings in the plane to be dimensioned such and in terms of the number thereof to be established such that either the plane in a perpendicular projection has an area coverage of less than 60%, typically less than 50%. On account of this relatively minor area coverage, the cylinder or the conveyor device, respectively, can be purged, in particular in a vertical direction, by a surrounding or a passing-through flow of air without interfering turbulences being created herein. On account thereof it is possible for the conveyor device to also be used for tasks that are susceptible to contamination such as, for example, in the production of optical apparatuses, in particular spectacle lenses.

Moreover, the openings, in particular recesses, in the plane reduce the mass of the plane such that the mass of the conveyor device to be moved is decreased in size. It is advantageous that, by virtue of the minor mass housing element providing the plane, for example of the transport table, the rotary unit requires only relatively little force in order for the linear conveyor unit to be rotated. This enables that relatively small drive forces suffice, and the safety of the conveyor device can be further increased by limiting the rotary force to low values, that is to say values that do not pose any danger.

Furthermore, the cylinder in one of the embodiments according to the disclosure is configured so as to have a closed surface shell. The closed surface shell of the cylinder herein, for reducing material or weight, can have round or angular openings or recesses, respectively, the diameter of the latter or the available width of the latter or the available length of the latter being smaller than or equal to 5 mm or smaller than or equal to 4 mm. For example, the cylinder can be formed by a circular-shaped sheet-metal plate of aluminum or steel, in particular by a sheet-metal mesh plate.

In one exemplary embodiment, the rotary unit can be connected to a control device. The control installation herein can limit the maximum force and/or the maximum speed of the rotary drive. Moreover, the control installation can detect any jamming of the rotary unit, for example by way of a sensor or by means of monitoring the operating current of the rotary drive motor. In the event of any jamming, the control installation can switch off the rotary drive or reverse the latter so as to eliminate the jamming.

For conveying transport containers along the plane that forms the transport surface it can be provided that the linear conveyor unit has a transport drive which is configured as a conveyor belt drive. To this end, the transport belt drive can have a conveyor belt which continuously revolves around two deflection rollers, the upper run of the conveyor belt running above the plane and the lower run of the conveyor belt running below the plane. The upper run herein can have a spacing from the plane that is smaller than or equal to 5 mm to minimize any risk of injury.

In order for production tolerances or age-related wear of the conveyor belt to be compensated, it is provided that the tension of the conveyor belt can be adjusted. It is provided that the spacing of the two deflection rollers of a conveyor belt is capable of being set. For example, the position of a deflection roller can be changed by way of a set screw. It is thus possible for elongations of a conveyor belt that arise in practical use, or tolerances of a conveyor belt, to be compensated and for the tension of the conveyor belt to be kept at an optimum value.

The conveyor belt can have two conveyor belts which are disposed so as to be parallel and to have a mutual spacing and which are connected by way of a common drive shaft. A design which is simple in terms of construction results in that the drive shaft is connected in a rotationally fixed manner to a deflection roller of a conveyor belt.

Driving the conveyor belt can be performed in that the transport drive has a drive motor for driving the drive shaft, and either the output of the drive motor is connected to the drive shaft directly or by way of a gearbox, in particular a gear-wheel gearbox or a belt gearbox. Alternatively, one of the conveyor belts can be guided by way of a third deflection roller which is disposed below the transport surface and is driven by the drive motor.

In order for problem-free transportation of the transport containers to be enabled, it can be provided that the transport table has two sheet-metal guide plates that run in parallel. The ends of the sheet-metal guide plates can be bent outward in such a manner that the ends form in each case an inlet funnel or an outlet funnel. The mutual spacing of the two sheet-metal guide plates herein is adapted to the maximum width of the transport container to be conveyed.

In one exemplary embodiment, the conveyor device can be used directly within a processing station of a production line. By virtue of its small dimensions, the conveyor device the latter can be disposed with a CNC machine or within a grinding machine, for example. The conveyor device herein can transport spectacle lenses to be machined in transport containers and supply the spectacle lenses to be machined to the CNC machine or the grinding machine, or transport the spectacle lenses to be machined away from the CNC machine or the grinding machine. For processing, a spectacle lens can be retrieved from the transport container and transported to a processing station by way of a robotic arm, for example. A spectacle lens in this context is understood to be an optical lens for a set of spectacles. The machined part can subsequently be placed back into the transport container and transported onward.

In order for the throughput to be increased, a second conveyor device can also be provided for receiving the parts machined by the CNC machine or grinding machine and for transporting away the parts. In this way it is possible for optical lenses to be produced on a relatively small installation area.

In another exemplary embodiment, it can be provided that the conveyor device is configured as a line converger. The conveyor device herein converges individual part-streams which are supplied from different transporting directions so as to form a single conveying stream and conveys the latter onward in a transporting direction. In another exemplary embodiment, it is conceivable that the conveyor device is configured as a line turnout. That is to say that the conveyor device distributes a conveying stream conveyed in a transporting direction to a plurality of part-streams and conveys the latter in each case onward in different transporting directions.

It is furthermore conceivable that the conveyor device according to the disclosure in practical use, conjointly with a plurality of units, is switched together so as to form a comparatively large sorting device. Such a sorting device can, for example, comprise a plurality of the conveyor devices according to the disclosure, which are connected together either so as to be directly mutually adjoining or by means of interposed conveyor belts. In particular, a plurality of the sorting devices can be arranged so as to be directly mutually adjoining, to form an N×M matrix. Complex distributing and conveying objects can also be achieved on a relatively small installation area by way of such a sorting device. It is typical that the individual conveyor installations according to the disclosure can be disposed directly beside one another since, by virtue of the round and stationary external contour of the cylinder, there is no risk of bruising to operators in the intermediate spaces present between the neighboring conveyor installations.

The stationary cylinder forms in particular the external contour of the conveyor device. In the case of a combination of the conveyor device with further conveyor devices and/or conveyor belts which adjoins directly neighboring conveyor devices or infeed belts or outfeed belts. On account of the stationary cylinder, no relatively mutually movable parts and thus no dangerous bruising or shearing points for operators exist in this region between the conveyor devices or between the conveyor device and the infeed or outfeed belts.

In one exemplary embodiment, it is provided that the conveyor device is upgraded in a modular manner in order for a storage device for transport containers to be configured. A storage device of this type can have a holding device for mounting the transport container at a spacing above the plane, for example.

In an exemplary embodiment, the storage device comprises, for example, a frame having two vertically running rails, wherein the holding device is fastened to the rails in order for transport containers to be mounted or fixed to the at least two rails. The frame at the lower end thereof can in particular be connected to the transport table or to the housing element providing the plane, and the holding device mounts or fixes a transport container to the rails at a vertical spacing above the transport table such that the vertical spacing is larger than the maximum height of a transport container to be conveyed.

In an exemplary embodiment, a circular-cylindrical third housing element for the holding device prevents operators from reaching into the holding device.

In another exemplary embodiment, a fourth housing element is present that closes off the third housing element at an upper end thereof. The fourth housing element, in a manner analogous to that of the first housing element, has a plurality of third openings having assigned opening widths, wherein the opening widths of all of the third openings are smaller than or equal to 5 mm, and/or the number of the third openings is measured such that the plane in the perpendicular projection has an area coverage of less than 60% or of less than 50%.

Furthermore, a lifting installation which raises a transport container from the plane encompassing the transport surface by a distance that is somewhat larger than the maximum height of a transport container to be conveyed can be provided. The raised transport container is then fixed above the holding device, for example to the rails. The storage device thus mounts transport containers above the plane at such a spacing that the transportation of following transport containers is not compromised.

The holding device mounts or fixes transport containers to the rails at a vertical spacing above the plane that is larger than the maximum height of a transport container to be conveyed. The storage device can thus mount one or a plurality of transport containers, for example on the rails, and serves, so to speak, as a storage or as a buffer for transport containers.

In order for high safety standards to be met, it can be provided that the third housing element is configured as a touch safeguard in the form of a second, in particular vertically running, cylinder which is capable of being placed onto the cylinder of the conveyor device that forms the third housing element, wherein the diameter of the second cylinder corresponds to the diameter of the cylinder of the conveyor device. The length of the second cylinder typically corresponds to at least the length of the storage device, in particular of the frame described above, for example, in order for a touch safeguard across the entire surface to be formed. The second cylinder can be mounted on the frame, for example. In order for transport containers to be fed in or fed out, the second cylinder can have openings which are attached to the lower end of the second cylinder and are adapted to the dimensions of a transport container, in particular to the cross section of the latter.

In order for a mechanically stable mounting of the transport containers to be enabled, it can be provided that the rails laterally guide or support, respectively, the transport containers. A transport container typically has in each case a lateral groove into which a guide rail of the holding device or of the lifting installation engages.

In order for a transport container to be stored, the latter has to be vertically raised. To this end, it can be provided that the rails have a lift drive for lifting transport containers in the vertical direction from the transport table and/or for lowering the transport containers onto the transport table. The lift drive herein can be disposed on the transport table or on one or on both rails in order for transport containers to be raised or lowered in the vertical direction.

A plurality of transport containers can be disposed on top of one another on the rails. It is thus possible for a stack which is held on the rails to be created from a plurality of transport containers that are disposed on top of one another. The frame can consequently mount a stack comprising a plurality of transport containers that are disposed on top of one another in the vertical direction. The mounting is typically performed in that the holding device mounts or fixes at least the lowermost transport container on the vertically running rails. Such a stack can be composed of a plurality, typically more than five, transport containers that are disposed on top of one another. Individual transport containers are successively raised in order for the stack to be constructed. These the transport containers that are already present in the stack herein slide upward by one space. The stack that is constructed on the rails can serve for the short-term intermediate storage of individual transport containers or for the long-term storage, that is to say for storing a reserve of individual transport containers. For example, it can be provided that the storage device is used in a production line so as to serve as an intermediate storage or as a buffer for components or for raw material.

In order for the conveyor device according to the disclosure to be upgraded in a simple manner it can be provided that the above-described transport table has two receptacles, spaced apart transversely to the transporting direction, for connecting the two vertical rails of the frame, wherein each of the receptacles is disposed in a region between a conveyor belt and the external edge of the transport table and, typically in a releasable manner, connects one vertically running rail to the transport table. For example, the rails can be screw-fitted to the receptacles of the transport table.

In order for a mechanically stable construction mode to be achieved, it can be provided that the frame on the upper side thereof has a yoke or housing that connects the two rails. In order for the safety to be increased it is provided herein that the length of the rails is longer by at least 10 cm than the maximum stacking height of the piece goods such that the spacing between the yoke or the upper side of the housing and the upper edge of the stack is at least 10 cm. It is prevented on account thereof that a jamming location that is dangerous for the operator is created at the upper end of the stack.

For friction-free transportation, it is in particular provided that the mutual spacing of the vertically running rails corresponds to at least the width of the transport container to be transported. Consequently, the length of the yoke that connects the two rails likewise corresponds to at least the width of the transporting transport container or to the width of the transport container to be transported and additionally to the width of the rails.

In one exemplary embodiment, it can be provided that the lifting installation has a first stationary part and a second part that in a driven manner is displaceable in the vertical direction, wherein pivotable rails which interact with a groove that is disposed on a pack or a transport container so as to hold the pack or transport container are provided both on the first stationary part as well as on the second displaceable part. The rails of the stationary part are pivoted outward in order for transport containers to be raised or lowered. The rails of the displaceable part remain in the groove of the transport container and mount the latter. The displaceable part of the lift drive, together with the transport containers, is subsequently repositioned vertically to a position lying therebelow or thereabove. The rails of the stationary part of the lift drive at the new position are finally pivoted inward again so as to fix the transport container at the new position. In order for a transport container to be placed onto the transport table, both the rails of the stationary part as well as the rails of the movable part are released so that the transport container is lowered onto the transport table.

Alternatively or additionally, it can also be provided that the transport table has a lifting installation having one lifting cylinder or a plurality of lifting cylinders in order for transport containers to be raised or lowered in the vertical direction. A lifting cylinder on the upper side thereof has a lifting ram which engages through an opening of the transport table. The opening is typically dimensioned such that a gap between the ram and the transport table is smaller than or equal to 5 mm or smaller than or equal to 4 mm, so as to reduce any risk of bruising at the gap.

In order for the risk of bruising for an operator in the region of the vertical rails to be moreover reduced it is typically also provided that the gap between the rails and the transport container mounted by the rails is smaller than or equal to 5 mm.

In an exemplary embodiment it is in particular provided that the upper side of the lifting ram in the resting position of the lifting installation is disposed so as to be flush with the transport table. On account thereof, the opening of the transport table in the resting position is closed off by the upper side of the lifting ram, and reaching into components that lie below the transport table by an operator is prevented.

In order for the safety to be further increased, it can be provided that a control device connected to the lifting installation limits the speed and/or the drive force of the lifting installation. Additionally, the control device can either switch off the lifting installation or reverse the latter somewhat in the event of any jamming, so as to prevent or resolve, respectively, any jamming.

A construction that is simple in mechanical terms results in that it is provided that the lifting installation, in particular the lifting cylinder, moves a single transport container or a stack of a plurality of transport containers. It is essential that the vertical stroke of the lifting installation is somewhat larger than the maximum height of a transport container to be conveyed. That is to say that a single transport container is raised from the surface of the transport table and transported to such a height which lies above an upper edge of the next transport container to be conveyed. The upper edge of the transport container to be raised in the course of this movement impacts the lower side of a transport container that is already present on the rails. The lifting installation in the movement thereof herein automatically entrains the latter and further raises the latter. On account of this movement, it is possible for a vertical stack composed of a plurality of individual transport containers to be formed solely by the lifting ram, without an additional lifting drive.

The retrieval of a transport container from the stack herein by the lifting ram in an exemplary embodiment progresses as follows:

In the case of an empty transport table the lifting ram is deployed until the upper side of the latter bears on the lower side of the stack of transport containers. The holding device is subsequently released such that the stack bears on the lifting ram and is held by the latter. The lifting ram, together with the stack, is subsequently lowered until the second transport container of the stack (when viewed from below) has been lowered to the corresponding height which lies above an upper edge of the next transport container to be conveyed. The transport container which now forms the lowest part of the stack is fixed to the rails by switching on the holding device. On account thereof, the entire remaining stack which is supported on the lowermost transport container is also mounted and fixed on the rails by way of the holding device. The lifting ram subsequently further lowers the lowermost transport container until the latter bears on the transport table. Thereafter, the transport table can transport away the transport container in a desired transporting direction. In order for the transporting direction to be changed, the rotary drive rotates the transport table, together with the storage device, to the desired position.

In order for an ideally compact construction mode to be achieved it can be provided in an exemplary embodiment that the horizontal extent of the frame in the transporting direction and transverse to the transporting direction is smaller than or equal to the diameter of the transport table, typically that the diameter of the transport table is larger than a longitudinal extent and/or transverse extent of the transport containers to be conveyed.

An application of the conveyor device or storage device according to the disclosure in industry can be performed in the context of distributing individual parts or in the context of warehousing. The device according to the disclosure can also be used in transporting spare parts. Moreover, the device according to the disclosure can be used in production lines so as to secure the continuous material stream of individual parts. Above all, relatively small parts such as, for example, optical lenses, can be transported on a relatively small installation area by way of the conveyor device and/or storage device.

It is typically provided that the conveyor device and/or the storage device is/are primarily used for such transport containers the external dimensions of which do not exceed 50 cm in length, 40 cm in width, and 35 cm in height. Small transport containers the dimensions of which are 20 cm×10 cm×10 cm or even less can in particular be conveyed by way of the conveyor device and/or by way of the storage device.

In an exemplary embodiment, the second cylinder of the storage device has a diameter of 30 cm or less. By virtue of the compact design of the exemplary embodiment of the conveyor device and/or the storage device, the dimensions of the device being adaptable to the transport containers to be transported, only a minor installation area is thus required for a corresponding plant. The diameter of the first cylinder and/or the second cylinder herein defines the maximum interference contour of the storage device.

It is typical that transport containers can be permanently or temporarily stored in the storage device. It is achieved on account thereof that a product stream that is irregularly conveyed, that is to say a product stream in which a plurality of transport containers are conveyed at irregular spacings and/or in a pulsed manner, thus at irregular temporal intervals, is standardized on account of the storage device. That is to say, the individual transport containers arriving in an irregular manner are conveyed onward by way of a specific regular cycle. It is provided herein that transport containers that arrive by way of too short a cycle are temporarily stored by the storage device. Comparatively long intervals in the product stream can be bridged in that transport containers that are temporarily stored by the storage device are transported onward by way of a regular cycle by the conveyor installation.

The storage device having the stack as storage is constructed according to the FILO (First In Last Out) principle. This means that the first stored transport container is delivered last. In order for storage that operates according to the FIFO (First In First Out) principle to be obtained, two or more storage devices can be combined with one another. The storage device herein can have a horizontal transport device which is disposed, for example, in the upper region of the frame or the cylinder, and horizontally transports a transport container, typically the uppermost transport container in the stack, and transfers the transport container to a neighboring storage device. The transport container in the stack of the neighboring storage device is then transported downward and then is the first to leave the storage device for onward transportation. Such a storage device can be used, for example, as an intermediate storage for cooling components such as optical lenses.

In an exemplary embodiment, it can be provided that the storage device is used in a clean room or a gray room. It is typical herein for the storage device to be purged with purified air. In order for an ideally laminar air stream to be achieved herein, it is provided in particular that the cylinder on the upper side thereof is covered by a mesh, the openings of the mesh being dimensioned in such a manner that the openings at least in one direction are smaller than or equal to 5 mm and the mesh covers such an area that the storage device in a perpendicular projection has an area coverage of less than 60%, typically less than 50%. On account of this relatively minor area coverage, the cylinder can be purged, in particular in a vertical direction, by a surrounding or a passing-through flow of air without interfering turbulences being created herein.

It can furthermore be provided that the horizontal transport device has a transport housing which is disposed on the upper side of the second cylinder and on the upper side of the transport housing is covered by a covering mesh, the openings of the covering mesh being dimensioned in such a manner that the openings are smaller than or equal to 5 mm and the covering mesh covers such an area that the storage device in a perpendicular projection has an area coverage of less than 60%, typically less than 50%. The covering mesh herein can be dimensioned such that the covering mesh is interchangeable between the cylinder and the horizontal device in order for the number of parts required to be reduced.

The conveyor device according to the disclosure can also have one or a plurality of radio frequency identification (RFID) transponders which is/are provided for reading out an RFID tag that is conjointly carried by a transport container. The first housing element that conjointly rotates in the rotation of the linear conveyor unit in one variant of an exemplary embodiment has one or a plurality of fifth openings by way of which the one or the plurality of RFID transponders penetrate the plane. The one or the plurality of RFID transponders according to the disclosure are spaced apart from the plane by way of one or a plurality of gaps having assigned gap dimensions which all are smaller than or equal to 5 mm.

BRIEF DESCRIPTION OF THE DRAWINGS

The disclosure will now be described with reference to the drawings wherein.

DESCRIPTION OF EXEMPLARY EMBODIMENTS

Figure 1A:
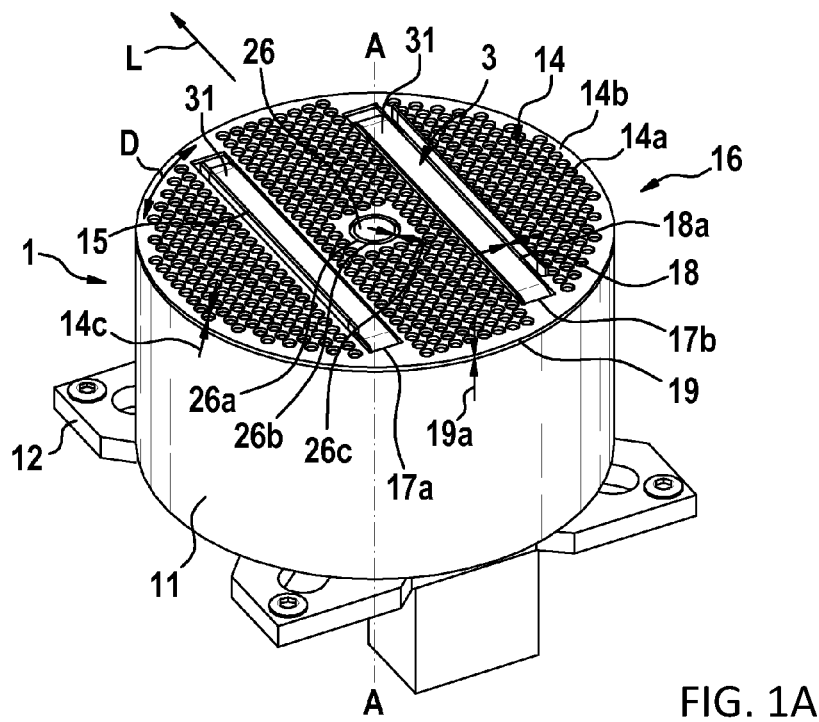
FIGS. 1A to 1C show a schematic illustration of a conveyor device according to the disclosure.
Figure 1B:
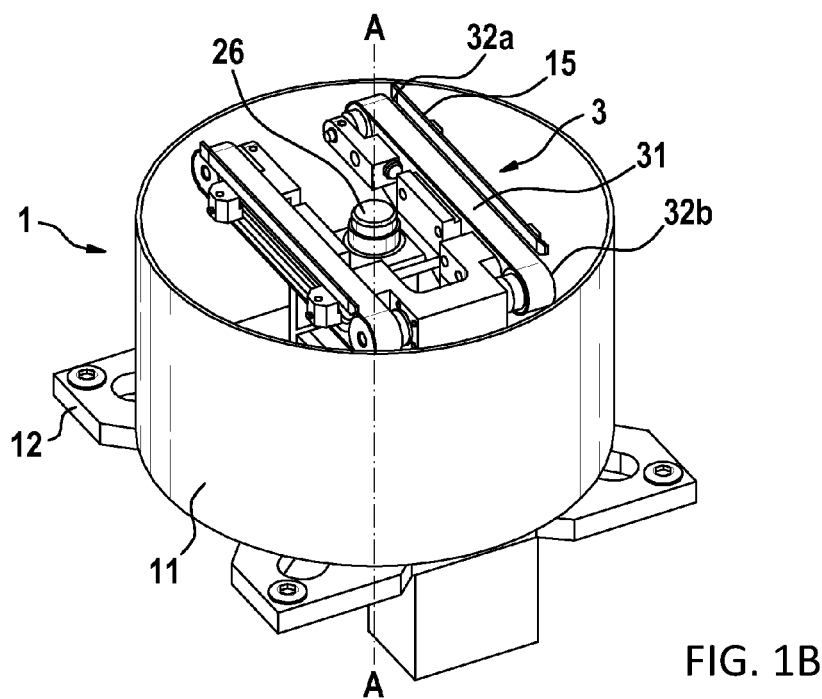
Figure 1C:
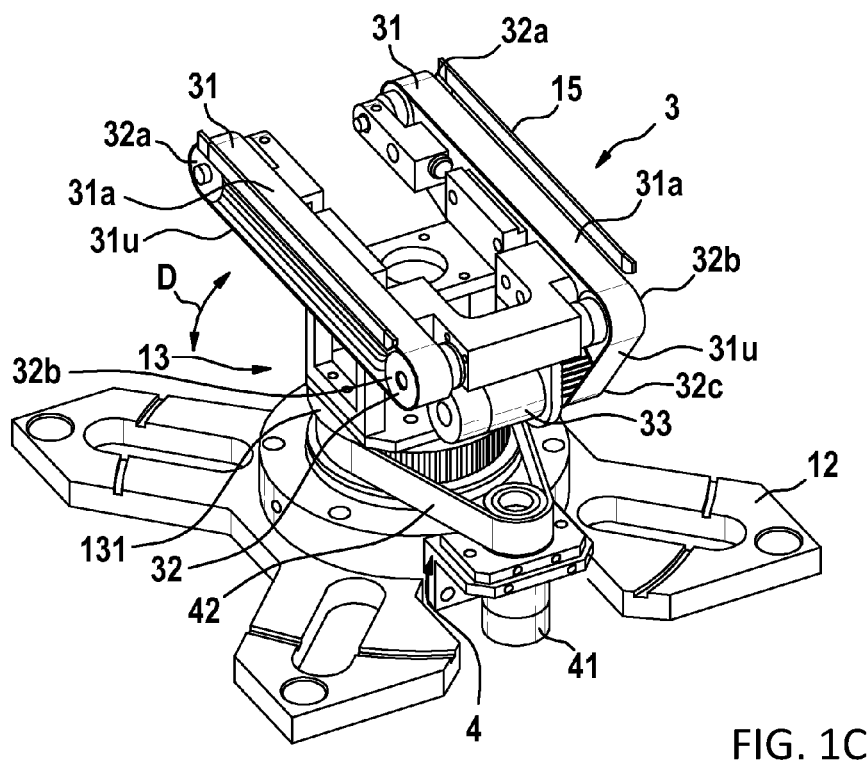

A conveyor device 1 is illustrated in FIGS. 1A to 1C. The conveyor device 1 has a linear conveyor unit (described hereunder) and a rotary unit (presented hereunder) for rotating the linear conveyor unit in the rotation directions D shown in FIG. 1A. A cylinder 11 that is fastened to a base 12 and a transport table 13 are component parts of the conveyor unit. The cylinder 11 on the upper side thereof is closed off by a horizontal plane 14a which forms a transport surface and which forms the external side of a first housing element 14. The fastened cylinder 11 forms a second housing element 11. The first housing element 14 and the second housing element 11 are components of a housing 16 which houses the rotary unit and at least partially houses the linear conveyor unit.

A transport drive 3 of the linear conveyor unit is disposed on the transport table 13 in order for transport containers to be transported in a transporting direction L along the transport surface 14a of the transport table 13.

FIG. 1B shows the conveyor device 1 having a first housing element 14 removed, the latter being configured in the form of a plate, and the conveyor device 1 in FIG. 1C is illustrated having a removed plate 14 and a removed cylinder 11 in order for the interior of the cylinder 11 to be schematically shown.

The transport table 13 has a column 131 that is mounted so as to be rotatable on the base 12. The transport drive 3 is mounted on the column 131. The column 131 on the upper side thereof supports the plate 14. The transport table 13 can be rotated about the vertically running axis A with the aid of a rotary drive 4 which is disposed in the interior of the cylinder 11 in order for the transporting direction L, specifically the direction in which a transport container is transported, to be changed.

The circular cylinder 11 that is fastened to the base 12, together with the plate 14, configures a housing 16 that is closed at least toward the top. The rotary drive 4 of the rotary unit and the transport drive 3 of the linear conveyor unit are disposed within the closed housing 16. That is to say, all movably driven components of the rotary drive 4 or transport drive 3 are situated within the closed housing 16, or have a spacing of less than 5 mm from the housing 16, and are thus protected against inadvertent contact. The rotary drive 4 comprises a rotary motor 41 which by way of a belt gearbox having a timing belt 42 drives a toothed disk which is connected in a rotationally fixed manner to the transport table 13. The rotary drive 4 is capable of rotating the column 131 and thus the transport table 13 by 360°, this being identified by the reference sign D. On account of the use of a position sensor or a servo motor, arbitrary rotary angles can be set and the transporting direction L thus be changed by arbitrary angles.

The transport drive 3 is mounted on the transport table 13. That is to say that the transport drive 3 is conjointly moved in the rotation D of the transport table 13. The transport drive 3 comprises a conveyor belt 31 having two conveyor belts 31 which are mutually spaced apart transversely to the transporting direction L and which are guided so as to continuously revolve around deflection rollers 32a and 32b. The two conveyor belts 31 penetrate two openings 17a, 17b that are incorporated into the plate 14. The upper run 310 of a respective conveyor belt 31 therefore runs on top of the transport surface 14b of the transport table 13. The lower run 31u of the respective conveyor belt 31 as well as the drive motor 33 of the linear conveyor device are disposed below the transport surface 14, thus within the closed housing 16. The drive motor 33 is connected to a third deflection roller 32c by way of a gearbox and by way of the third deflection roller 32c drives one of the conveyor belts 31. The two deflection rollers 32b are coupled to one another in a rotationally fixed manner by way of an axle such that the drive motor 33 ultimately drives both conveyor belts 31 in a synchronous manner.

Figure 2:
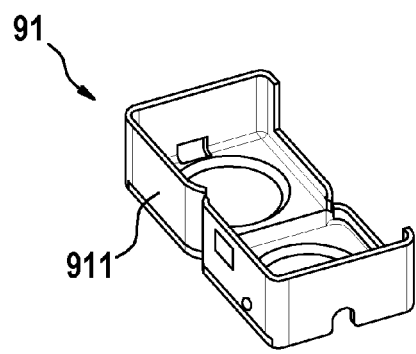
FIG. 2 shows a transport container.

FIG. 2 shows a transport container 91. The transport container 91 has a receptacle space which can receive loose transported goods, in particular individual parts, for example optical lenses (typically spectacle lenses) or loose individual components (for example spectacle frames) or basic materials. An RFID tag on which data pertaining to the transported goods, thus pertaining to the optical lens, for example, are stored is disposed on the transport container 91. The transport table 13 has an RFID transponder 26 in order for data of the RFID tag to be read or written. In as far as the transported goods are blanks for the production of optical lenses, data of the lens to be produced can be stored by way of the RFID tag, the data serving for setting or controlling processing machines.

The transport container 91 moreover comprises a groove 911. The groove 911 can interact with a holding rail 251 in order for the transport container 91 to be held or to be guided in a straight direction along a holding rail 251 which will be described hereunder in the context of FIGS. 5A and 5B.

To ensure an interference-free transportation of the transport containers 91, the transport table 13 has two sheet-metal guide plates 15 which are disposed on either side of the conveyor belts 31. The mutual spacing of the two sheet-metal guide plates 15 is adapted to the transverse extent of the transport containers 91 to be transported. That is to say, the mutual spacing of the two sheet-metal guide plates 15 is dimensioned so as to be somewhat larger than the maximum transverse extent of a transport container 91 to be transported. A sheet-metal guide plate 15 has a vertically running leg which configures a left-side or right-side fence along which a transport container 91 can slide. It is thus prevented that a transport container 91 in transportation slides off the conveyor belt 31 toward the left or the right As is illustrated in FIG. 1A, the transport surface 14 is provided with recesses 14a. The recesses 14a are dimensioned such that a finger of a human hand cannot reach into the recesses. The recesses 14a in terms of the recess width 14c thereof are therefore smaller than or equal to 5 mm. Moreover, the gap dimension 19a of the gap 19 between the stationary circular cylinder 11 and the moving external edge of the plate 14 is smaller than or equal to 5 mm. The upper run 310 of the conveyor belt 31 is also guided above the transport surface 14b by way of a spacing that is smaller than or equal to 5 mm. On account of the dimensions, any reaching of fingers or fingertips, respectively, into the recesses 14a, or into gaps 18, 19 present, respectively, is positively avoided. A high level of operator safety for operators is thus achieved.

Figure 3A:
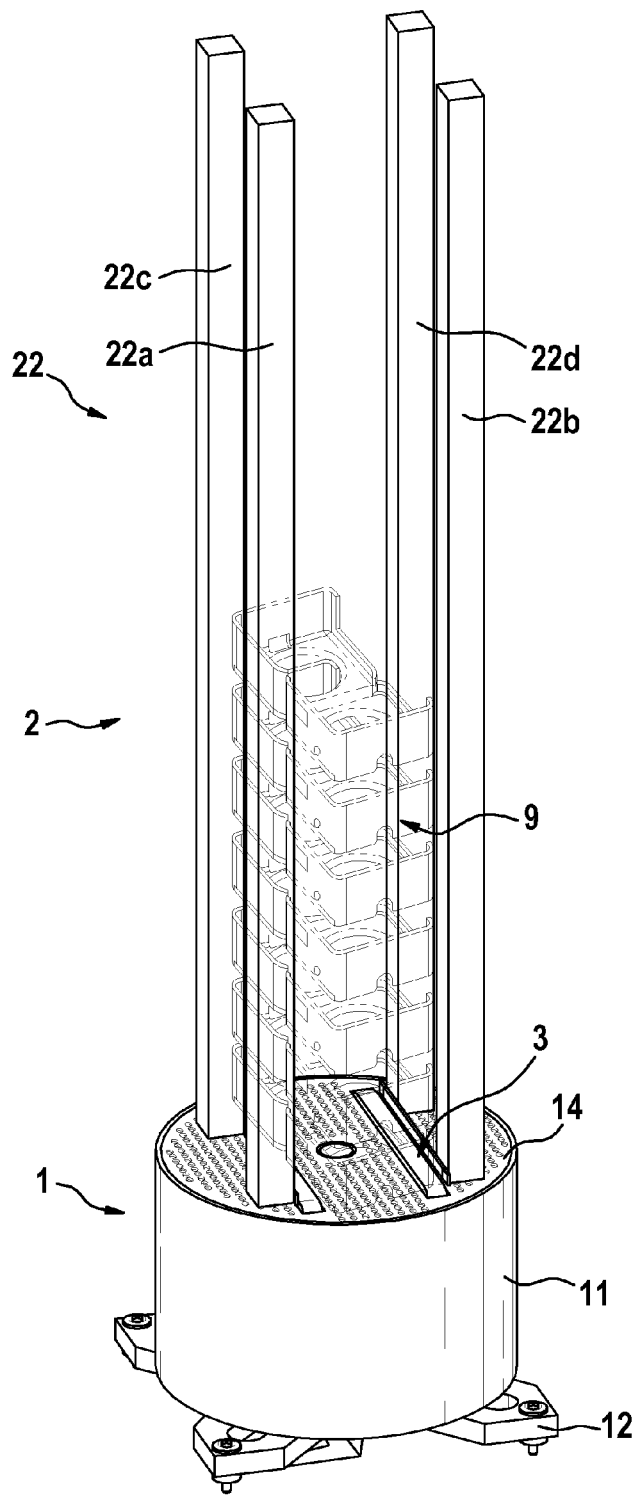
FIGS. 3A-3C show a schematic illustration of a conveyor device according to the disclosure having a storage device.
Figure 3B:
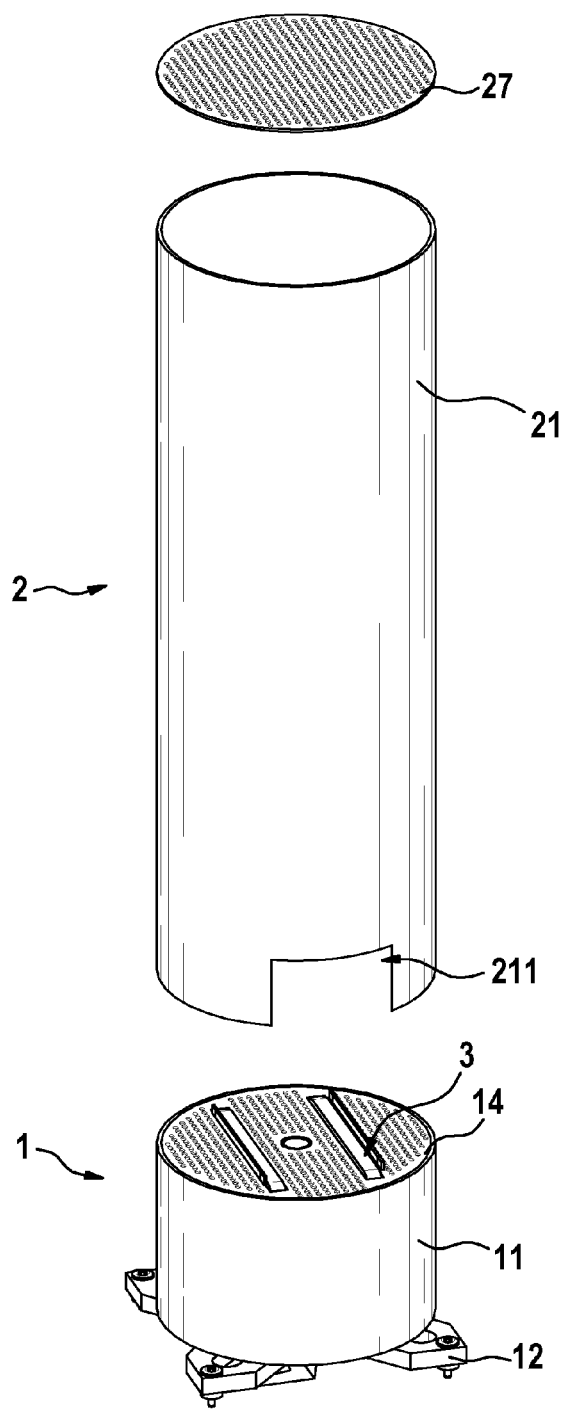
Figure 3C:
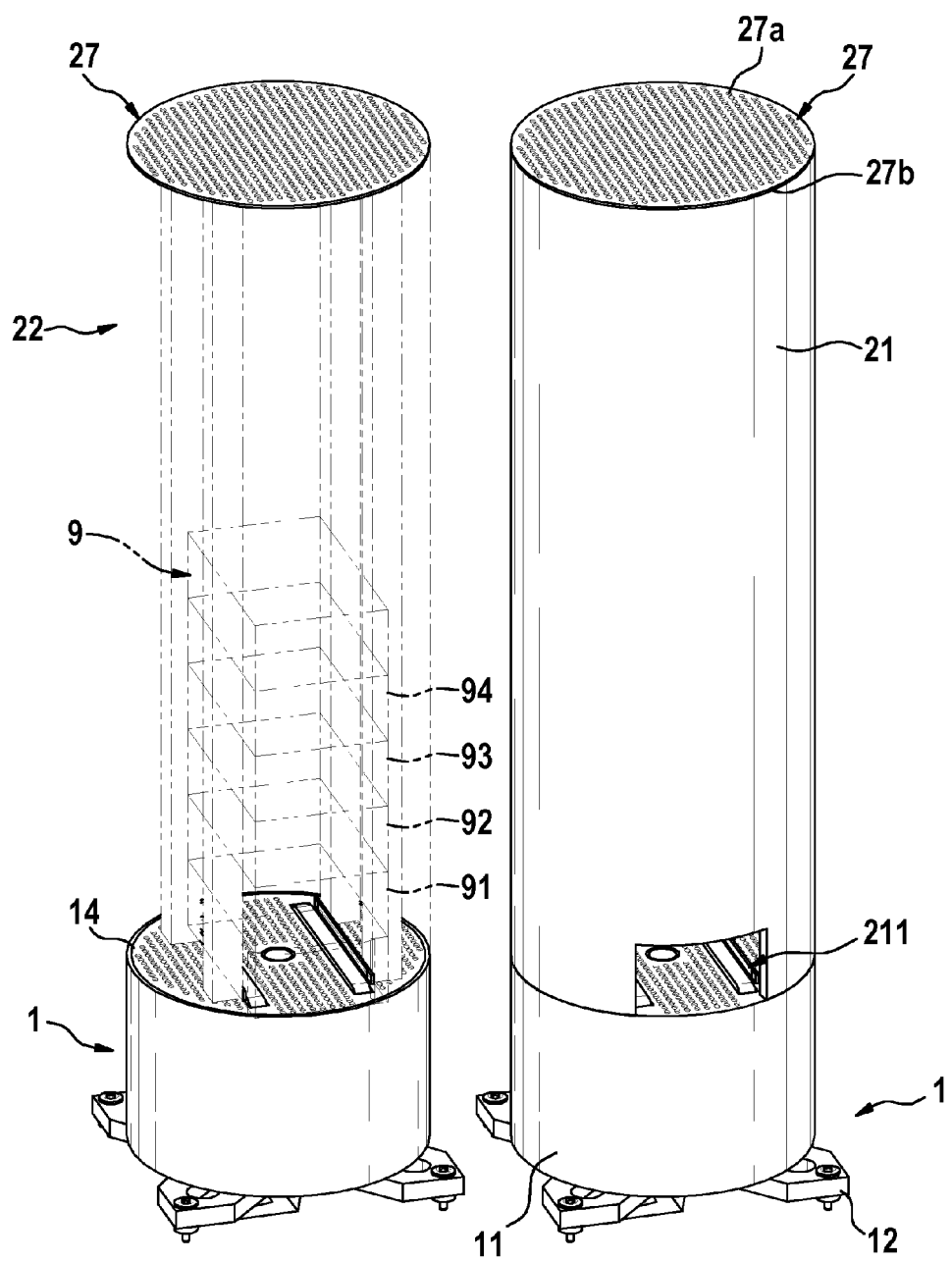

FIGS. 3A to 3C show the conveyor device 1 upgraded by way of an optional module so as to form a storage device 2. FIG. 3A shows the conveyor device 1 having the storage device 2 in a schematic illustration and without a protective second cylinder 21. FIG. 3B shows an exploded illustration of the conveyor device 1. FIG. 3C in the left illustration shows the internal workings and in the right illustration an external view of the conveyor device 1 having the storage device 2.

The conveyor device 1 has a first cylinder 11 and a second cylinder 21 which is connected to the first cylinder 11 and in terms of length extends the latter in an upward manner. The second cylinder 21 serves as a touch safeguard and prevents that operators can be jammed by moving parts of the storage device 2. The second cylinder 21 on the lower side thereof has openings 211 through which a transport container 91 can be transported into the second cylinder 21 or out of the second cylinder 21. The transportation of the transport containers 91 herein is performed by the transport drive 3 of the linear conveyor unit of the conveyor device 1.

The second cylinder 21 on the upper side thereof is covered by a covering mesh 27. The covering mesh 27 is configured as a round covering mesh 27 and in terms of the dimensions thereof corresponds to the plate 14. The covering mesh 27 has openings 27a which are dimensioned such that the openings 27a at least in terms of the opening width 27b thereof are smaller than or equal to 5 mm. Moreover, the covering mesh 27 covers such an area that the conveyor device 2 in a perpendicular projection has an area coverage of less than 60%, typically less than 50%. The conveyor device 2 can thus be purged by a surrounding laminar stream of purified air without excessive turbulences being created in the laminar flow.

Figure 4:
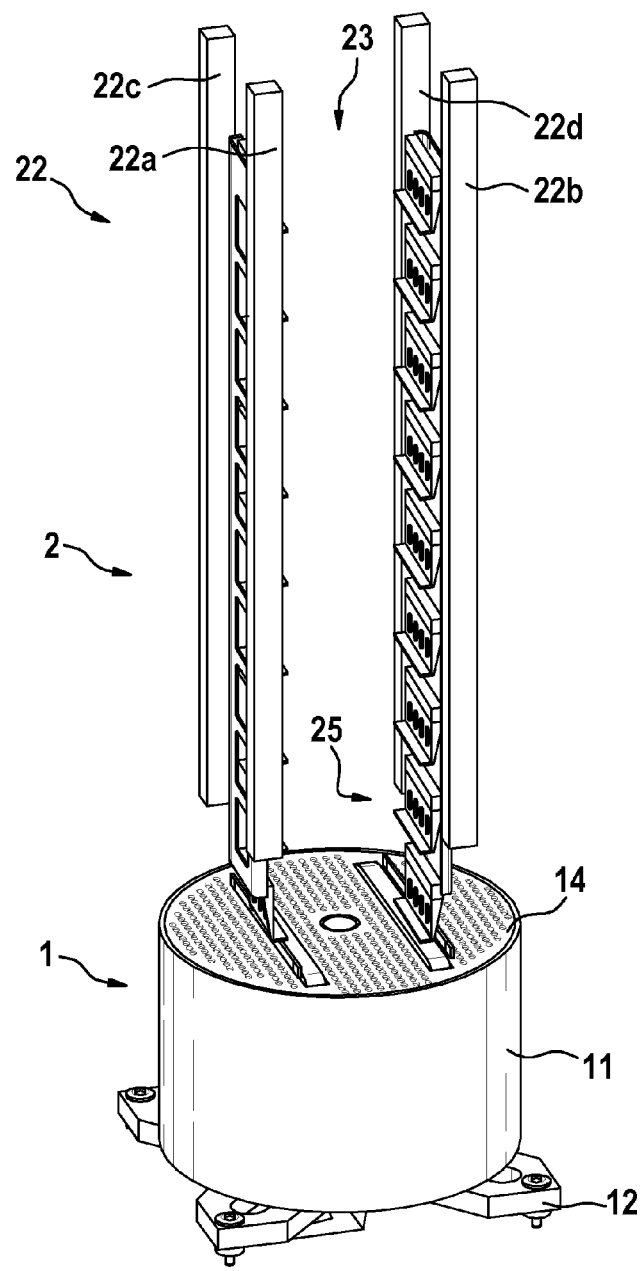
FIG. 4 shows the storage device according to FIGS. 3A-3C having a lifting installation.

The conveyor device 2 has a frame 22 having vertically running rails 22a, 22b, 22c, and 22d. The vertical rails 22a, 22b, 22c, and 22d, on the lower side thereof are releasably connected of the plate 14 or to the transport table 13, respectively. The spacing of the vertical rails 22a, 22b, 22c, and 22d is adapted to the dimensions of the transport containers 91. The stack 9 in the example illustrated is a stack 9 from a plurality of transport containers 91, 92, 93, and 94. The stack 9 is mounted to the vertically running rails 22a, 22b, 22c, and 22d by way of a holding device 25 shown in FIGS. 4 to 5B.

Figure 5A:
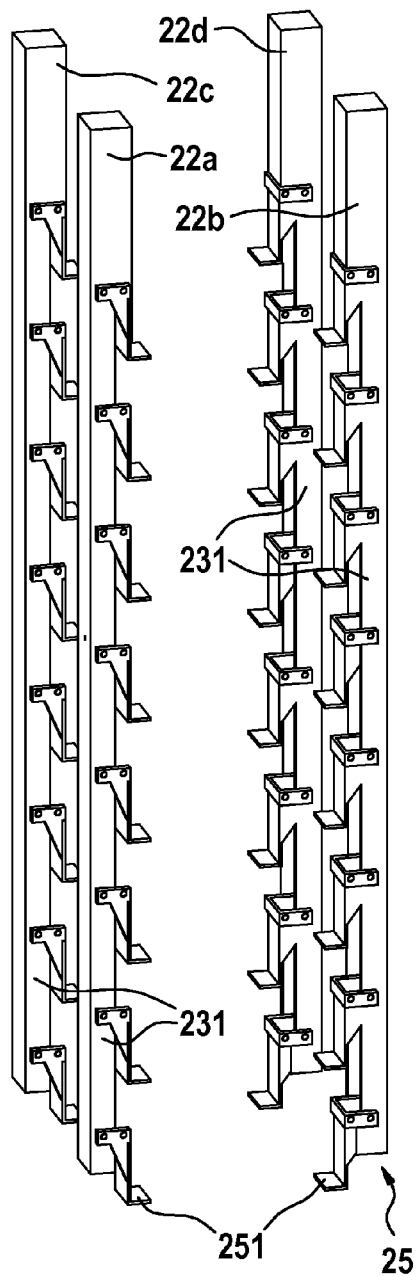
FIGS. 5A, 5B show the lifting installation according to FIG. 4 in a stand-alone illustration.
Figure 5B:
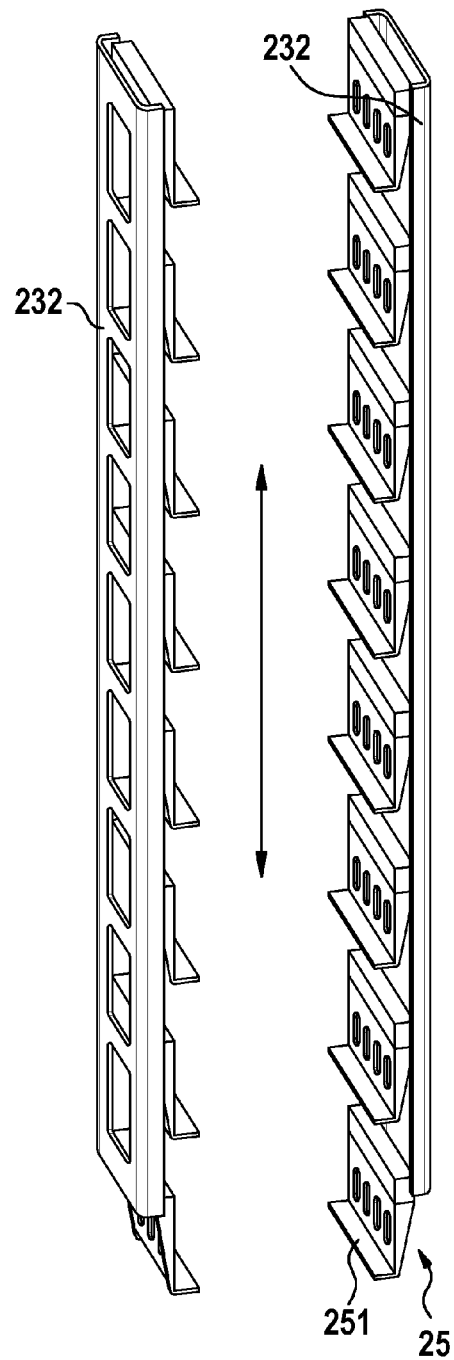
Figure 5C:
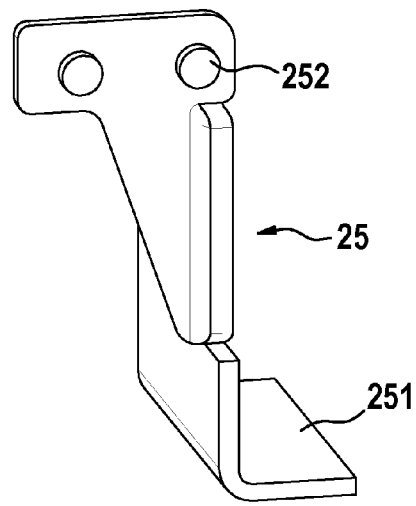
FIG. 5C shows an enlarged illustration of a part of the holding device of the lifting installation according to FIG. 4.

A lift drive 23 is provided for transferring a transport container 91, 92, 93, 94 to the stack 9. The lift drive 23 can have a lift motor which is disposed on the frame 22. As is illustrated in FIGS. 5A and 5B, the lift drive is constructed in two parts. The lift drive has first stationary parts 231 which are mounted on the vertical rails 22a, 22b, 22c, and 22d (FIG. 5A). A second part 232 is mounted so as to be vertically displaceable on the rails 22a, 22b, 22c, and 22d (FIG. 5B). Both parts 231 and 232 have horizontally running guide rails 251 which engage in the groove 911 of a transport container 91 in order for the latter to be held. As is illustrated in FIG. 5C, the holding rails 251 are mounted on the lift drive 23, thus on the first part 231 or the second part 232, so as to be in each case pivotable about a pivot axle 252. The holding rails 251 can be pivoted out of the groove 911 of a transport container 91 by way of a lifting magnet.

The raising of a transport container 91 takes place as follows: A transport container 91 is conveyed through the opening 211 and herein, by way of the groove 911, slides onto the holding rail 251 of the first and second part of the lift drive 23. The holding rails of the stationary part 231 are subsequently pivoted outward such that the transport container 91 now is only held by the holding rails of the movable part 232. The latter is then repositioned upward and herein entrains the transport container 91. Having arrived at the destination position, the holding rails of the stationary part 231 are pivoted into the groove 911 again and firmly hold the transport container 91. The holding rails of the movable part 232 can thereafter be released and the movable part 232 can be repositioned downward again. The lowering of a transport container 91 takes place in an analogous manner in the reversed sequence.

Figure 6:
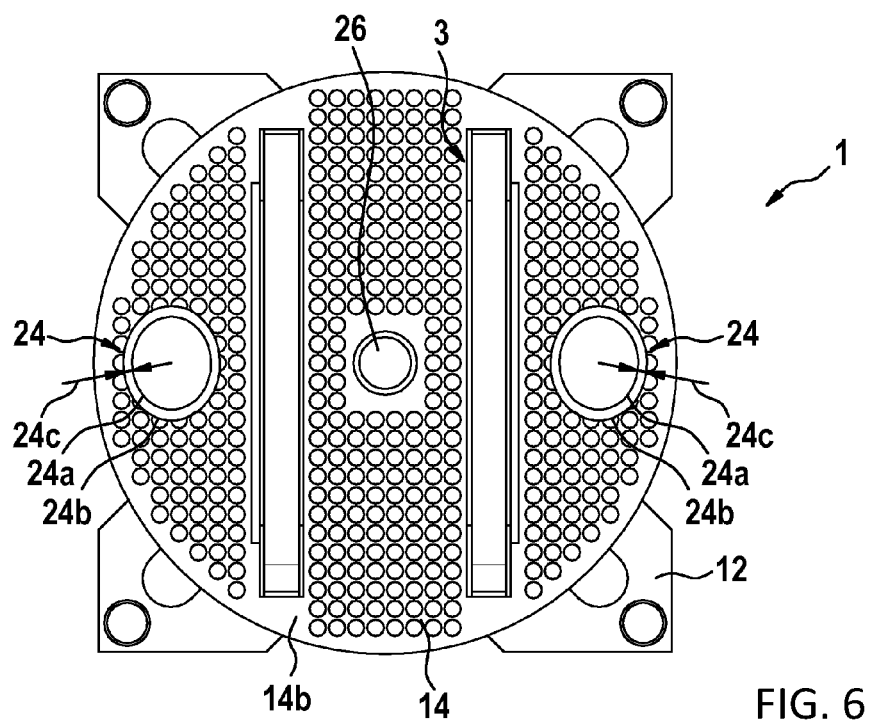
FIG. 6 shows a conveyor device according to the disclosure having a lifting cylinder.

Alternatively or additionally, lifting cylinders 24 which are disposed in the housing 16 of the conveyor device 1 can be provided. As is shown in FIG. 6, the lifting cylinders 24 are disposed below the transport surface 14b. A pneumatically or hydraulically driven lifting ram of a lifting cylinder 24 penetrates the transport surface 14b by way of an opening 24a and is deployed upward in order for a transport container 91 to be raised. The gap dimension 24c of the gap 24b between the lifting cylinder 24 and the transport surface 14b herein is less than 5 mm in order for bruising or shearing locations to be avoided.

The conveyor device 1 herein stores transport containers 91 in the manner of a FILO storage. This means that the transport container 91 that is first stored in the storage is again delivered as the last. The storage device 2 can be rotated by way of the rotary drive 4 of the conveyor device 1 in order to change the transporting direction L of the transport containers 91 to be stored or delivered. It is typical herein that the external cylinder 21 of the storage device 2 and the external cylinder 11 of the rotary and linear conveyor units of the conveyor device 1 are stationary, thus do not move in the rotation D, in order for the risk of bruising or shearing to be reduced.

It is furthermore provided that the opening 211 is adapted to the dimensions of a transport container 91 such that a gap of less than or equal to 5 mm is between a transport container 91 and the opening 211. The jamming of fingers during the input or output of transport containers 91 can thus be prevented. Moreover, the drive force of the transport drive 3 can be limited to non-hazardous values such that the risk of injury is lowered.

Figure 7:
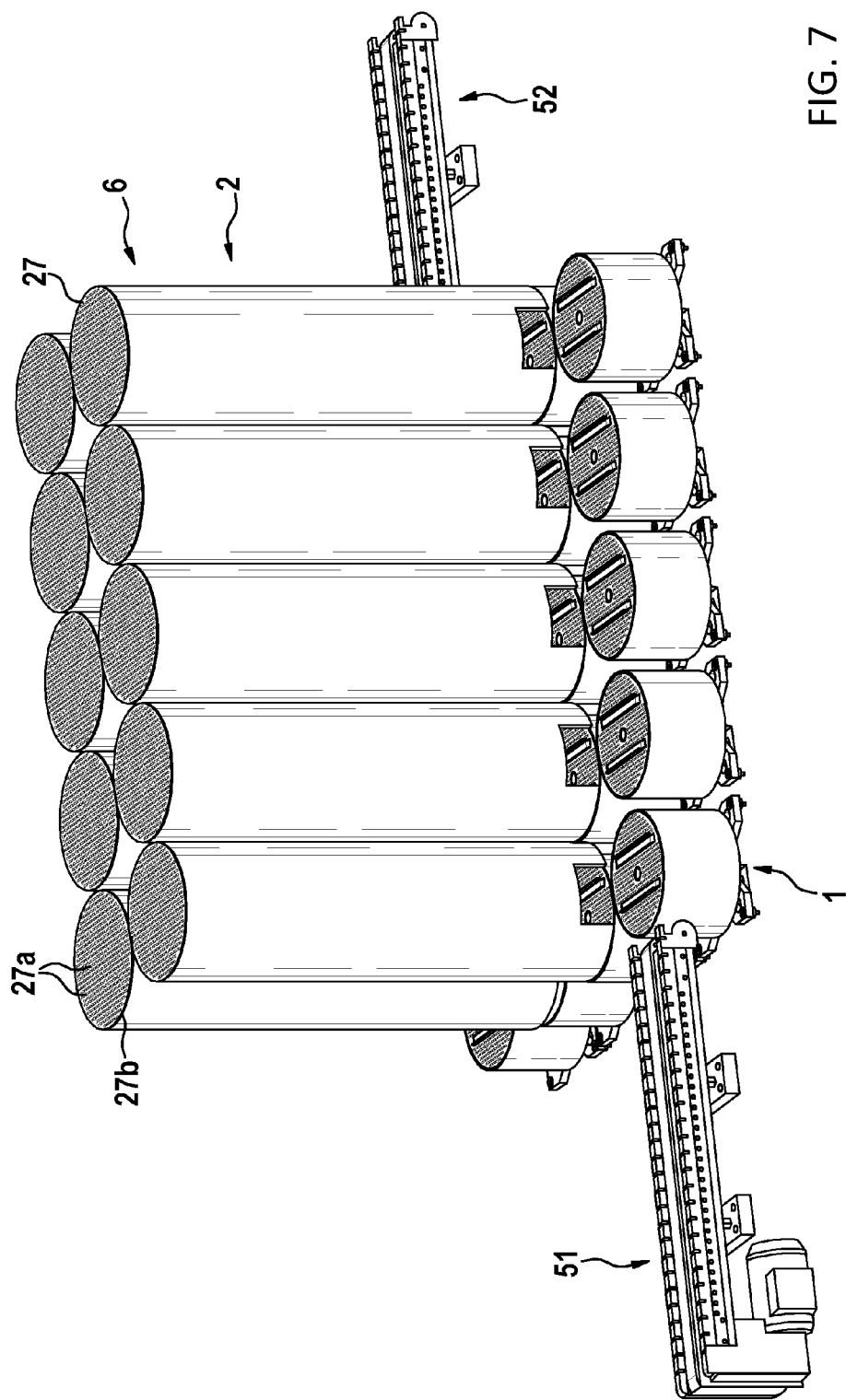
FIG. 7 shows a storage assembly having a matrix of conveyor devices.

FIG. 7 shows a storage assembly having a matrix comprising a plurality of conveyor devices 1 having a storage device 2. This is a 5×2 matrix of conveyor devices 2 which are in each case connected to 5 conveyor installations 1 without a storage device. Transport containers 91, 92, 93, 94 are fed to the conveyor devices 1 and thus to the storage assembly by way of an infeed belt 51. An outfeed belt 52 transports onward transport containers 91, 92, 93, 94 that are delivered from the storage assembly. The transportation of transport containers 91, 92, 93, 94 is performed in that the infeed belt 51 slides a transport container 91 onto the transport drive 3 of a conveyor device 1 so far until the conveyor belt 31 or the conveyor belts 31 of the transport drive 3 can grip and transport onward the transport container 91. The outward transportation is performed in that the conveyor belts 31 of the transport drive 3 of a conveyor device 1 slide the transport container 91 onto the outfeed belt 52 so far so that the latter can acquire the transport container 91 and transport the latter onward.

Two neighboring conveyor devices 2 are in each case conjointly switched. The two neighboring conveyor devices 2 conjointly configure a FIFO storage assembly. This means that a transport container 91, 92, 93, 94 that enters first is delivered as the first again. The transport containers 91, 92, 93, 94 are transported through the storage devices 2 along the transporting direction indicated by arrows in FIG. 7. A horizontal transport device 6 is in each case disposed on the upper side of the storage devices 2. The horizontal transport device 6 transports horizontally in each case the uppermost transport container 94 of a stack 9 and transfers the uppermost container 94 to the neighboring storage device 2. A transport container 91 thus travels upward in the first storage device 2 and is transferred horizontally to the second storage device 2. The transport container 91 travels downward again in the second storage device 2. A FIFO storage assembly is thus implemented.

In order for potential bruising locations or shearing locations to be prevented in the case of a directly neighboring disposal of the conveyor devices 1, it can moreover be provided that sensors, which monitor whether a transport container 91, 92, 93, 94 is situated on a neighboring conveyor device 1 or a neighboring transport surface 14b, so as to then suppress any rotation D, are provided. Cameras or light barriers can be used as sensors, for example.

The conveyor device 1 according to the disclosure can be used either as a standalone individual apparatus for transport purposes, or optionally as a combination of a plurality of conveyor devices 1. The conveyor devices 1 can be disposed so as to be directly beside one another or behind one another in order for complex distribution tasks to be implemented. A comparatively large storage can also be provided in that a multiplicity of conveyor devices 1 are combined and are combined in the form of an N×M matrix, for example a 6×4 matrix, so as to form a comparatively large storage unit. Individual parts which are contained in the respective transport containers 91, 92, 93, 94 can be stored in such a storage, for example. A series circuit of a plurality of storage devices 1 can also be provided, in order for the storage capacity to be increased or for the throughput time to be increased, for example. A long throughput time is advantageous, for example, when the conveyor device 1 is used as a cooling store for heated components.

It is possible for individual parts such stored to be fed to manufacturing in the required sequence by way of a corresponding control device, for example. It is provided herein that each conveyor device per se is organized as a so-called last-in-first-out storage device, or two conveyor devices 1 are in each case combined so as to form a first-in-first-out storage device. Such a storage, on account of the compact construction mode, requires only a relatively small installation area.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

1 Conveyor device
11 First cylinder
12 Base
13 Transport table
131 Column
14 Housing element
14a Recesses
14b Plane
14c Opening width
15 Sheet-metal guide plate
16 Housing
17a Opening
17b Opening
18 Gap
18a Gap dimension
19 Gap
19a Gap dimension
2 Storage module
21 Second cylinder
211 Opening
22 Frame
22a First vertical rail
22b Second vertical rail
22c Third vertical rail
22d Fourth vertical rail
23 Lift drive
231 Stationary part
232 Repositionable part
24 Lifting cylinder
24a Opening
24b Gap
24c Gap dimension
25 Holding device
251 Holding rail
252 Pivot axis
26 RFID transponder
26a Opening
26b Gap
26b Gap dimension
27 Mesh
27a Opening
27b Opening width
3 Transport drive
31 Conveyor belt
310 Upper run
31u Lower run
32 Drive shaft
32a First deflection roller
32b Second deflection roller
32c Third deflection roller
33 Transport motor
4 Rotary drive
41 Rotary drive motor
42 Timing belt
51 Infeed belt
52 Outfeed belt
6 Horizontal transport device
9 Stack
91 First transport container
911 groove
92 Second transport container
93 Third transport container
94 Fourth transport container
A Rotation axis
D Rotation direction
L Linear conveying direction

The invention claimed is:

1. A conveyor device for a transport container for spectacle lenses, the conveyor device comprising:
a linear conveyor unit configured to convey the transport container in a rectilinear direction;
a rotary unit configured to rotate the linear conveyor unit around a rotational axis; and
a first housing element configured to rotate conjointly with the linear conveyor unit,
wherein the first housing element includes a plate and at least one first opening extending through the plate,
wherein the linear conveyor unit penetrates the plate through the at least one first opening,
wherein the linear conveyor unit is spaced apart from the plate by a first gap having a first gap dimension,
wherein the first gap dimension is smaller than or equal to 5 mm,
wherein the first housing element has a plurality of second openings extending through the plate,
wherein the plurality of second openings have assigned openings widths that are smaller than or equal to 5 mm,
wherein the conveyor device is configured to be purged by purified air flowing through the plurality of second openings, and
wherein a number of the second openings is selected such that the plate has an area coverage of less than 60% in a projection direction perpendicular to the plate.

2. The conveyor device as claimed in claim 1, further comprising:
a stationary circular-cylindrical second housing element configured to enclose the rotary unit,
wherein the stationary circular-cylindrical second housing element is configured to not rotate conjointly with the linear conveyor unit, and
wherein the plate of the first housing element of the linear conveyor unit is arranged within the stationary circular-cylindrical second housing element and is configured to have a shape complementary to the stationary second housing element.

3. The conveyor device as claimed in claim 1, wherein the plate of the first housing element that conjointly rotates in the rotation of the linear conveyor unit is spaced apart from the stationary second housing element by a second gap having a second gap dimension which is smaller than or equal to 5 mm.

4. The conveyor device as claimed in claim 1, wherein the number of the second openings is selected such that the plate has the area coverage of less than 50% in the projection direction perpendicular to the plate.

5. The conveyor device as claimed in claim 1, wherein the linear conveyor unit further comprises:
a transport drive having a conveyor belt that is configured to continuously revolve around two deflection rollers,
wherein the conveyor belt has an upper run and a lower run,
wherein the upper run of the conveyor belt runs above a plane defined by the plate and the lower run of the conveyor belt runs below the plane defined by the plate, and
wherein the upper run has a spacing from the plane that is smaller than or equal to 5 mm.

6. The conveyor device as claimed in claim 5, wherein the transport drive has two conveyor belts which are disposed parallel to each other with a mutual spacing, and wherein the two conveyor belts are connected with a common drive shaft.

7. The conveyor device as claimed in claim 6, wherein the transport drive further comprises:
a transport motor configured to drive the drive shaft,
wherein either an output of the transport motor is connected to the drive shaft with a gearbox, or one of the conveyor belts is guided by a third deflection roller which is disposed below the plane and is driven by the transport motor.

8. The conveyor device as claimed in claim 1, further comprising:
a holding device configured to receive a transport container at a spacing above the plate.

9. The conveyor device as claimed in claim 8, further comprising:
a circular-cylindrical third housing element for the holding device.

10. The conveyor device as claimed in claim 9, further comprising:
a fourth housing element configured to close off the third housing element at an upper end thereof,
wherein the fourth housing element has a plurality of third openings having third opening widths,
wherein the third opening widths are smaller than or equal to 5 mm, and
wherein a number of the third openings is selected such that the fourth housing element has an area coverage of less than 60% in a projection direction perpendicular to the fourth housing element.

11. The conveyor device as claimed in claim 9, further comprising:
a lifting installation configured to raise the transport container in a vertical direction of the plate and/or to lower the transport container onto the plate.

12. The conveyor device as claimed in claim 11, wherein the lifting installation is configured to raise the transport container to a spacing above the plate in the holding device, and
wherein the holding device is configured to hold the transport container.

13. The conveyor device as claimed in claim 9, wherein the lifting installation further comprises:
a lifting cylinder configured to raise, to lower, or to raise and lower the transport container in the vertical direction,
wherein the first housing element has at least fourth opening,
wherein the lifting cylinder is arranged within the fourth opening and penetrates the plate,
wherein the lifting cylinder is spaced apart from the plate by a fourth gap having a fourth gap dimension, and
wherein the fourth gap dimension is smaller than or equal to 5 mm.

14. The conveyor device as claimed in claim 9, further comprising:
a horizontal transport device which is disposed at a spacing above the plate and is configured to transport the transport container in a horizontal direction.

15. The conveyor device as claimed in claim 1, further comprising:
a radio frequency identification (RFID) transponder,
wherein the first housing element has a fifth opening extending through the plate,
wherein the RFID transponder is arranged in the fifth opening,
wherein the RFID transponder is spaced apart from the plate by a fifth gap having a fifth gap dimension, and
wherein the fifth gap dimensions is smaller than or equal to 5 mm.

16. A plurality of conveyor devices as claimed in claim 1, wherein the conveyor devices are arranged directly beside one another or behind one another, respectively, in an N×M matrix.

17. A plurality of conveyor devices for a transport container for spectacle lenses, the plurality of conveyor devices being disposed directly beside one another or behind one another, respectively, in an N×M matrix, wherein each conveyor device of the plurality of conveyor devices comprises:
a linear conveyor unit configured to convey the transport container in a rectilinear direction;
a rotary unit configured to rotate the linear conveyor unit around a rotational axis;
a first housing element configured to rotate conjointly with the linear conveyor unit, and
a stationary circular-cylindrical second housing element configured to enclose the rotary unit,
wherein the first housing element includes a plate and at least one first opening extending through the plate,
wherein the linear conveyor unit penetrates the plate through the at least one first opening,
wherein the linear conveyor unit is spaced apart from the plate by a first gap having a first gap dimension,
wherein the first gap dimension is smaller than or equal to 5 mm, wherein the first housing element has a plurality of second openings extending through the plate, wherein the plurality of second openings have assigned openings widths that are smaller than or equal to 5 mm, wherein the stationary circular-cylindrical second housing element is configured to not rotate conjointly with the linear conveyor unit, wherein the plate of the first housing element of the linear conveyor unit is arranged within the stationary circular-cylindrical second housing element and is configured to have a shape complementary to the stationary second housing element wherein the rotary unit and all driven components of the conveyor device are completely disposed within the circular-cylindrical second housing element, wherein the circular-cylindrical second housing element is configured as an closed shell surface which does not have any or a plurality of round or angular openings, and wherein a diameter of the plurality of round or angular openings is smaller than or equal to 5 mm.

18. A method of conveying a transport container for spectacle lenses with a plurality of conveyor devices arranged in an N×M matrix, the conveyor devices being disposed directly beside one another or behind one another, wherein each conveyor device includes:

a linear conveyor unit configured to convey the transport container in a rectilinear direction;

a rotary unit configured to rotate the linear conveyor unit around a rotational axis;

a first housing element configured to rotate conjointly with the linear conveyor unit, and a stationary circular-cylindrical second housing element configured to enclose the rotary unit, wherein the first housing element includes a plate and at least one first opening extending through the plate, wherein the linear conveyor unit penetrates the plate through the at least one first opening, wherein the linear conveyor unit is spaced apart from the plate by a first gap having a first gap dimension, wherein the first gap dimension is smaller than or equal to 5 mm, wherein the first housing element has a plurality of second openings extending through the plate, wherein the plurality of second openings have assigned openings widths that are smaller than or equal to 5 mm, wherein the stationary circular-cylindrical second housing element is configured to not rotate conjointly with the linear conveyor unit, wherein the plate of the first housing element of the linear conveyor unit is arranged within the stationary circular-cylindrical second housing element and is configured to have a shape complementary to the stationary second housing element wherein the rotary unit and all driven components of the conveyor device are completely disposed within the circular-cylindrical second housing element, wherein the circular-cylindrical second housing element is configured as an closed shell surface which does not have any or a plurality of round or angular openings, and wherein a diameter of the plurality of round or angular openings is smaller than or equal to 5 mm, the method comprising:

performing at least one of:
conveying the transport container in the rectilinear direction;
rotating the linear conveyor unit with the rotary unit; or
purging the conveyor device with purified air.

19. A conveyor device for a transport container for spectacle lenses, the conveyor device comprising:

a linear conveyor unit configured to convey the transport container in a rectilinear direction;

a rotary unit configured to rotate the linear conveyor unit around a rotational axis;

a first housing element configured to rotate conjointly with the linear conveyor unit, a stationary circular-cylindrical second housing element configured to enclose the rotary unit;

a holding device configured to receive a transport container at a spacing above the first housing element; and a lifting installation configured to raise the transport container in a vertical direction of the plate and/or to lower the transport container onto the first housing element, wherein the first housing element includes a plate and at least one first opening extending through the plate, wherein the linear conveyor unit penetrates the plate through the at least one first opening, wherein the linear conveyor unit is spaced apart from the plate by a first gap having a first gap dimension, wherein the first gap dimension is smaller than or equal to 5 mm, wherein the first housing element has a plurality of second openings extending through the plate, wherein the plurality of second openings have assigned openings widths that are smaller than or equal to 5 mm, wherein the stationary circular-cylindrical second housing element is configured to not rotate conjointly with the linear conveyor unit, wherein the plate of the first housing element of the linear conveyor unit is arranged within the stationary circular-cylindrical second housing element and is configured to have a shape complementary to the stationary second housing element wherein the rotary unit and all driven components of the conveyor device are completely disposed within the circular-cylindrical second housing element, wherein the circular-cylindrical second housing element is configured as an closed shell surface which does not have any or a plurality of round or angular openings, wherein a diameter of the plurality of round or angular openings is smaller than or equal to 5 mm, wherein the lifting installation is configure to raise the transport container to a spacing above the plate, wherein the holding device is configured to hold the transport container, wherein the lifting installation includes a lifting cylinder configured to raise or lower the transport container in the vertical direction, and wherein the first housing element has a fourth opening in which the lifting cylinder is arranged, the lifting cylinder extending through the plate.

20. The conveyor device as claimed in claim 19, wherein the lifting cylinder is spaced apart from the plate by a second gap having a second gap dimension, wherein the second gap dimension is smaller than or equal to 5 mm.

* * * * *

UNITED STATES PATENT AND TRADEMARK OFFICE
CERTIFICATE OF CORRECTION

PATENT NO. : 10,569,961 B2
APPLICATION NO. : 16/444373
DATED : February 25, 2020
INVENTOR(S) : Thomas Hofer and Ralf Meschenmoser It is certified that error appears in the above-identified patent and that said Letters Patent is hereby corrected as shown below:

In the Claims

Column 20, Line 18, Claim 13, change "at least fourth" to -- at least a fourth --.

Column 21, Line 17, Claim 17, change "an closed shell" to -- a closed shell --.

Column 21, Line 59, Claim 18, change "an closed shell" to -- a closed shell --.

Column 22, Line 46, Claim 19, change "an closed shell" to -- a closed shell --.

Column 22, Line 50, Claim 19, change "configure to" to -- configured to --.

Signed and Sealed this
Twenty-eighth Day of April, 2020

Andrei Iancu
*Director of the United States Patent and Trademark Office*